United States Patent Office 3,271,462
Patented Sept. 6, 1966

3,271,462
ELIMINATION OF POLYOXYALKYLENE
UNSATURATION
Mason H. Earing, Grosse Ile, Mich., assignor to Wyandotte Chemicals Corporation, Wyandotte, Mich., a corporation of Michigan
No Drawing. Filed June 29, 1962, Ser. No. 206,169
20 Claims. (Cl. 260—615)

This invention relates to a method of decreasing or eliminating unsaturation in polyoxyalkylene polyol compounds. More particularly, this invention relates to a method of eliminating olefinic linkages in polyoxyalkylene polyol compounds.

In recent years, there has been a large increase in the use of polyoxyalkylene polyol compounds as raw materials for producing polyurethane foams, solid elastomers, fibers, and coatings. Fundamentally, these polymers are produced by a reaction involving the terminal hydroxyl groups in the polyol and isocyanate groups in an organic polyisocyanate. In order to develop better polymer properties it is necessary to eliminate, as much as possible, terminal unsaturation which reduces or even destroys the polyfunctionality of such polyoxyalkylene compounds. It has been shown that the unsaturation in a polyoxyalkylene polyol affects the formation of a diisocyanate prepolymer in such a way that the rate of viscosity build-up and final viscosity value of the prepolymer decrease continuously with increasing unsaturation in the polyoxyalkylene polyol. In addition, G. J. Dege and his co-workers have shown, J. Am. Chem. Soc., 81, 3374 (1959), that, when the concentration of monofunctional polyether hydroxy compound in a polyoxyalkylene polyol exceeds 25 percent a diisocyanate prepolymer made from such a polyol cannot be foamed. It was also shown that the compression load capability of polyurethane foam, prepared from polypropylene glycol having a molecular weight of about 2,000, is materially reduced when the level of unsaturation in the polypropylene glycol reaches about 25 percent.

Because unsaturation in polyoxyalkylene polyol compounds represents a constant and difficult problem in their use, a great deal of research has been conducted to establish the exact form of the unsaturation. The result of such research has established that the unsaturation is present in two forms, commonly referred to as allyl and propenyl unsaturation, which may be represented as follows:

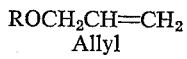   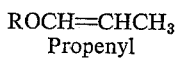
    Allyl                           Propenyl

For example, the recent work of Dege and his co-workers, cited above, has shown, on the basis of infrared data, that both allyl and cis-propenyl types of unsaturation are present in polyoxypropylene glycols.

Because of the presence of both allyl and propenyl unsaturation, standard techniques for eliminating unsaturation have not been sufficiently effective when applied to polyoxyalkylene polyol compounds. For example, only up to 50 percent of the unsaturation can be removed by treating the polyol with water and a dilute acid. Likewise, hydrogenation, which substantially eliminates the unsaturation, does not convert the terminal group of the polyoxyalkylene compound to a species capable of reaction in the formation of polymers. Thus, the hydrogenated polyoxyalkylene compound continues to act as a chain terminating group.

One of the principal factors affecting the degree of unsaturation in polyoxyalkylene polyol compounds is the temperature at which the polyoxyalkylene polyol compounds are made. It has been shown that the amount of unsaturation may double with as little as a 20° rise in the alkylene oxide condensation temperature and that, at a given temperature, the amount of unsaturation increases sharply as the final polyoxyalkylene compound molecular weight exceeds 1000 to 1200. However, to relate the problem of unsaturation strictly to temperature is perhaps to over-simplify the problem, for Dege and his co-workers, supra, claim that cis-propenyl unsaturation increases with increasing temperature, increasing catalyst concentration and in the presence of certain metallic surfaces. In an event, it is clearly seen that the problem of unsaturation in polyoxyalkylene compounds is a harassing and complex problem.

It is an object of this invention to provide a method for decreasing or eliminating the unsaturation in polyoxyalkylene polyol compounds.

It is a further object of this invention to provide a method for decreasing olefinic unsaturation in polyols for use in producing polyurethanes which is efficient, economical and easily adaptable to a continuous process.

Further objects and features of this invention will be apparent from the following specification and claims.

I have discovered that unsaturation in polyoxyalkylene polyol compounds can be substantially decreased or eliminated by contacting the polyoxyalkylene polyol compound with water and an acidic cation exchange resin which has been at least partially converted to the mercuric salt by treatment with a water-soluble mercuric salt such as mercuric acetate or mercuric sulfate.

In the method of this invention, a polyoxyalkylene polyol compound, being an alkylene oxide polymer which is a condensation product of water or an organic active hydrogen compound containing from about 2 to 8 active hydrogen atoms and about 2 to about 250 carbon atoms and an alkylene oxide or mixtures of alkylene oxides containing from about 2 to about 12 carbon atoms, is contacted with a mixture of water and mercury activated sulfonated polystyrene resin at a temperature of about 15° C. to about 100° C. The molecular weight of the polyoxyalkylene polyol compounds which are treatable by the method of this invention is in the range of 600 to 25,000. As mentioned earlier, the amount of unsaturation in polyoxyalkylene compounds is related to the molecular weight of the compound and it has been found that at molecular weights of less than 600 the amount of unsaturation is not of enough significance to warrant treatment. The upper limit of 25,000 is dictated by practical considerations. Since the amount of unsaturation in polyoxyalkylene compounds increases rapidly at molecular weights of 1,000 or more, it is preferable to carry out the method of this invention with regard to polyoxyalkylene compounds having a molecular weight of at least 1,000.

The unwanted unsaturation with which the process of this invention is concerned is not present in condensation products where ethylene oxide is the only alkylene oxide that is used. Thus, when dealing with heteric polymers containing ethylene oxide, it has been found that the degree of unsaturation does not become a problem unless an oxygen-carbon atom ratio of less than 0.45 is present in the polyol that is used. Hence, the method of this invention is most useful with heteric polymers having an oxygen-carbon atom ratio of less than 0.45.

It should be pointed out at this point that the mixture of water, activated resin and polyoxyalkylene compound should be neutral or acidic because a basic mixture would react unfavorably with the mercuric ions in the resin. Thus a mixture having a pH of less than 8.0 is preferred.

Good results are obtained by the method of the invention if the amount of water present is sufficient to saturate the polyoxyalkylene compound and anyone skilled in this art can easily determine the amount required to saturate a given polyoxyalkylene polyol compound. While water may be employed in an amount in excess of that required for saturation there is no advantage in doing so.

The amount of activated resin employed in the method of this invention is not critical; however, it has been found that the amount needed to achieve any appreciable results is about 1 weight percent of the polyoxyalkylene polyol compound. To derive maximum benefit from each gram of resin it is preferable to use an amount of resin from about 5 to 15 weight percent of the polyoxyalkylene compound. There is no upper limitation as to the amount of resin employed other than economic considerations.

In the preferred method of this invention the polyoxyalkylene polyol compound is brought into intimate contact with a mixture of water and sulfonated polystyrene resin at a temperature of about 20° C. to about 70° C., the resin having been activated by a replacement of a portion or all of its acidic hydrogen atoms by mercuric ions. After a contact time of several hours the resin is removed from the mixture by filtration and the polyoxyalkylene compound is stripped of any remaining water.

It should be noted that the contact time of the polyoxyalkylene polyol compound with the mixture of water and resin may vary from a very few minutes up to several hours. The primary factor in determining the contact time is the ability to bring the polyoxyalkylene compound into intimate contact with the resin and water. Thus, by the use of a turbine mixer good results are obtained in as little as 15 minutes. However, it has been found that the optimum contact time, when employing a less efficient stirrer, is approximately 3 hours.

Another advantage of this invention is that it may be employed in a continuous as well as a batch process. For example, the polyol can be saturated with water and then the water-saturated polyoxyalkylene polyol compound can be passed through a bed of activated resin of sufficient volume to provide the necessary contact time as between the resin and polyoxyalkylene compound.

The acidic cation exchange resins which can be employed in the method of this invention are well known in the art. The resins are of the sulfonated polystyrene type commercially available under the trademarks Amberlite IR–112(H), Permutit Q and Dowex 50W–X8. These resins are copolymers of styrene and divinylbenzene containing nuclear sulfonic acid groups attached to the styrene-divinylbenzene matrix. The resins are usually supplied in the form of spherical granules and are strongly acidic showing good stability to strong acids and alkali and moderate oxidizing agents. A further description of the acidic cation exchange resins that can be used in the method of the invention can be found in the "Encyclopedia of Chemical Technology" by Kirk-Othmer, volume 8, pages 1–17 (1952).

The resin, when employed in this invention, is activated before use by converting it to the mercuric salt. As stated earlier this can be done by treating the resin with any water-soluble mercuric salt. For example, the resin can be activated by stirring it with a solution of water and mercuric acetate or mercuric sulfate. Another satisfactory method of activating the resin is to dissolve mercuric oxide in dilute sulfuric acid and then stir the resin with the acid solution. While the resin may be activated by the use of any water-soluble mercuric salt, I prefer to use mercuric acetate to avoid the risk of possible contamination of the polymer. It should be recognized at this point that the sulfonated polystyrene resin is rendered effective by the replacement of a portion but probably not all of its acidic hydrogen atoms by mercuric ions. It is extremely difficult, if not nearly impossible, to determine with any degree of certainty what percentage of acidic hydrogens has been replaced. It is doubtful, however, that all the acidic hydrogen atoms are replaced. The amount of the mercuric salt that is used in the activation of the resin is not critical and can be varied widely. Good results are obtainable when a ratio of about 0.01 to 1.0 gram of mercuric salt per gram of resin is employed. In the activation process the mercuric salt is put into aqueous solution and then mixed with the sulfonated resin. Upon the completion of the mixing the resin is separated from the aqueous mercuric salt solution and washed with deionized water until no mercuric ion can be detected when the filtrate is saturated with hydrogen sulfide.

The temperature range over which the process of this invention can be carried out is from about 15° C. to about 100° C. It has been found that at temperatures below 15° C. the reaction rate is too slow to be practical, while at temperatures above 100° C. degradation of the resin occurs. The preferred temperature range is from about 20° C. to about 70° C.

The pressure at which the method of this invention can be performed is not critical. Subatmospheric, atmospheric or superatmospheric pressure can be employed; however, for practical considerations, atmospheric pressure is preferred.

The polyol compounds in which the unsaturation is reduced by the method of this invention are the condensation products of water or an organic active hydrogen compound containing from about 2 to 8 active hydrogen atoms and about 2 to about 250 carbon atoms and an alkylene oxide or mixtures of alkylene oxides containing from about 2 to 12 carbon atoms. The polyoxyalkylene polyol compounds treated by the method of this invention are further characterized by having an average oxygen:carbon atom ratio of less than 0.45 and a molecular weight of from about 600 to 25,000. Representative of the alkylene oxides that can be used to prepare polyoxyalkylene compounds which can be treated by the process of the invention are ethylene oxide, propylene oxide, butylene oxide, amylene oxide, cyclohexene oxide, styrene oxide and dodecyl oxide and mixtures thereof. The term "reactive hydrogen atom," as employed in this invention, is well known and clearly understood by those skilled in the art. However, to remove any possible ambiguity in this regard, the term "reactive hydrogen atom," as used herein and in the appended claims, includes any hydrogen atom fulfilling the following two conditions:

(1) It is sufficiently labile to open the epoxide ring of 1,2-propylene oxide, and (2) It reacts with methyl magnesium iodide to liberate methane in the classical Zerewitinoff reaction (see Niederl and Niederl, Micromethods or Quantitative Organic Analysis, p. 263, John Wiley and Sons, New York city 1946).

Examples of compounds having reactive hydrogen atoms with which an alkylene oxide can be condensed to produce a polyol suitable for use in the method of the invention are water and aliphatic, polyhydric alcohols such as ethylene glycol, propylene glycol, 2,3-butylene glycol, 1,3-butylene glycol, 1,5-pentanediol, pentaerythritol, 1,6-hexanediol, 1,2,6-hexanetriol, glycerol, 1,1,1-trimethylolpropane, sorbitol, sucrose and the like. Another class of reactive hydrogen compounds that can be used includes the alkylamines and alkylene polyamines having at least 2 reactive hydrogen atoms such as methylamine, ethylamine, propylamine, butylamine, hexylamine, ethylenediamine, 1,6-hexanediamine, diethylenetriamine, and the like. Still another class of reactive hydrogen compounds that can be used are the hydroxyphenyl alkanes such as bisphenol A, 1,1,3-(4-hydroxyphenyl)propane and 1,1,2,2 - tetrakis(hydroxypolypropyleneoxyphenyl)ethane. Compounds of this type, including high molecular weight reactive hydrogen compounds, are disclosed in British Patent 892,173. Also, such cyclic amines as piperazine, 2-methylpiperazine and 2,5-dimethylpiperazine can also be used. Amides constitute a further class of such reactive hydrogen compounds, such as acetamide, succinamide and benzenesulfonamide. The di- and polycarboxylic acids, such as adipic acid, succinic acid, glutaric acid, aconitic acid, aconitic acid, diglycolic acid, and the like, can also be used. It will also be recognized that the reactive hydrogen compound can be one containing different functional groups having reactive hydrogen atoms, such as citric acid, glycolic acid, ethanolamine, and the like. Still other such reactive hydrogen compounds can also be used so long as the particular compound meets the two conditions as set forth above.

Examples of alkylene oxide condensation products having current commercial significance are those made from propylene oxide or butylene oxide. The active hydrogen compounds commonly employed in the preparation of these products are water and alkane polyols having from about 2 to 8 hydroxyl groups, such as propylene glycol, glycerol, 1,1,1-trimethylolpropane, pentaerythritol and 1,2,6-hexanetriol. In addition, the products can be made using mixtures of ethylene oxide, propylene oxide and butylene oxide, in which the oxides are reacted in any sequence or in any mixture within the limits given herein.

The following examples are provided so as to more clearly illustrate the method of this invention to those skilled in the art and they should not be employed to unduly restrict the invention as disclosed and claimed herein. The degree of unsaturation as reported throughout the specification is expressed in milliequivalents per gram (meq./g.) and was measured by the mercuric acetate method which has been proposed as a standard analytical technique to the American Society for Testing Materials by the Urethane Foam Committee, Cellular Plastics Division of the Society of Plastics Industry, Inc. This test carries the ASTM designation D–1638–60T.

Example I

An acidic cation exchange resin was activated by stirring, at room temperature, 100 grams of Dowex 50W–X8 resin, H+ form, 20–50 mesh, with 17.5 grams of mercuric acetate in 200 ml. of distilled water. The stirring was continued for one-half hour and then the resin was separated from the mercuric acetate solution and washed with deionized water until no mercuric ion could be detected when the filtrate was saturated with hydrogen sulfide. The resin was then dried in a vacuum desiccator. The Dowex 50W–X8 is a synthetic resin of the styrene-divinylbenzene copolymer type with nuclear sulfonic acid as the functional groups. It contains 8 percent divinylbenzene, has a density of about 50 pounds per cubic foot, about 53 percent moisture content and an exchange capacity of about 37.0 kilograms as $CaCO_3$ per cubic foot, 5.0 meq./g. dry resin and 1.7 meq./ml. wet resin.

Into a 1-liter flask equipped with a mechanical stirrer and thermometer were charged 20 grams of distilled water, 2 grams of acetic acid and 60 grams of the activated resin. The acetic acid was added to insure that the pH of the ultimate mixture did not exceed 8.0. To this mixture there were added 600 grams of a propylene oxide polymer having a molecular weight of about 1900 and an unsaturation value of 0.029 meq./g. The polymer was a diol and was the condensation product of propylene oxide and propylene glycol. The mixture was stirred at a temperature of about 50° C.±5° C. for a period of 3 hours. The resin was then removed from the mixture by filtration and the water stripped from the polymer at 120° and 10 mm. pressure. The final unsaturation value of the polymer was found to be 0.006 meq./g.

Example II

Example I was repeated except that the polymer was a triol and was the condensation product of propylene oxide and glycerol having a molecular weight of about 2300 and an unsaturation value of .026 meq./g. At the end of the treatment the polymer had an unsaturation value of 0.004 meq./g.

Example III

Example I was repeated except that the polymer was a triol and was the condensation product of propylene oxide and glycerol having a molecular weight of about 3,000 and an unsaturation value of 0.029 meq./g. At the end of the treatment the polymer had an unsaturation value of 0.004 meq./g.

Example IV

The cationic exchange resin was prepared as illustrated in Example I with the exception that 21.0 grams instead of 17.5 grams of mercuric acetate were used. 60 grams of distilled water and 60 grams of resin were charged into the flask. To this mixture were added 600 grams of a propylene oxide polymer having a molecular weight of 4100 and an unsaturation value of 0.079 meq./g. The polymer was a triol and was the condensation product of propylene oxide and 1,1,1-trimethylolpropane. The mixture was stirred at a temperature of about 50° C.±5° C. for a period of 3 hours. The resin was then removed from the mixture by filtration and the water stirpped from the polymer at 12° and 10 mm. pressure. The final unsaturation value was 0.028 meq./g.

Example V

Example IV was repeated except that the propylene oxide polyether triol had a molecular weight of about 5,000 and an unsaturation value of 0.08 meq./g. At the end of the treatment the polymer had an unsaturation value of 0.04 meq./g.

Example VI

This example illustrates the superior results obtainable by the use of the method of this invention in decreasing polyoxyalkylene polyol unsaturation as compared to the results obtained by acid hydrolysis.

In the first run, 200 grams of propylene oxide polymer having a molecular weight of about 2,000, an unsaturation value of 0.030 meq./g. and being a condensation product of propylene oxide and propylene glycol were added to 66 grams of Amberlite IR–112(H) resin which was wet with adsorbed water. The mixture of water, polymer and resin was heated to a temperature in the range of 60–70° C. and was stirred for a period of 8 hours. At the end of this treatment the polymer had an unsaturation value of 0.021 meq./g. The Amberlite resin is a copolymer of styrene and divinylbenzene containing nuclear sulfonic acid groups attached to the styrene-divinylbenzene matrix. The resin is supplied in the form of moist, odorless, light tan spherical beads in the size range of 0.45–0.50 mm. and has a density of about 47 pounds per cubic foot and an exchange capacity of about 1.2–1.5 meq./ml. of wet resin.

In a second run, 200 grams of the same propylene oxide polymer used in run 1 was added to 10 grams of water and 20 grams of Amberlite IR–112(H) resin. The resin had previously been activated by stirring it for about one-half hour with 200 ml. of water containing 10.8 grams of mercuric acetate. The mixture of water, polymer and activated resin was then heated to a temperature in the range of 40–50° C. and stirred for 4 hours. At the end of this period the polymer had an unsaturation value of only 0.002 meq./g.

It should be apparent that the objectives of this invention have been accomplished. Broadly speaking, a new method of reducing unsaturation in polyoxyalkylene polyol compounds has been provided which comprises intimately contacting the polyoxyalkylene polyol compound with a mixture of water and an acidic cation exchange resin partially converted to the mercuric salt.

I claim:

1. A method of removing unsaturation found in polyoxyalkylene polyol compounds which comprises intimately contacting said polyoxyalkylene polyol compound with a mixture, having a pH of less than 8.0, of water and a sulfonated polystyrene resin, at a temperature of about 15° C. to about 100° C., said sulfonated polystyrene resin being present in the minimum amount of 1 weight percent of the polyoxyalkylene compound and having been activated by the replacement of a portion of its acidic hydrogen atoms by mercuric ions; furthermore, said polyoxyalkylene polyol compounds being characterized by having an average oxygen:carbon atom ratio of less than 0.45 and a molecular weight from about 600 to about 25,000 and being a condensation product of an alkylene oxide containing from about 2 to 12 carbon atoms and an alkane polyol having from about 2 to 8 hydroxyl groups.

2. The method of claim 1 wherein said polyoxyalkylene polyol compound is a condensation product of propylene oxide and glycerol and has a molecular weight in excess of 1,000.

3. The method of claim 1 wherein said polyoxyalkylene polyol compound is a condensation product of propylene oxide and 1,1,1-trimethylol-propane and has a molecular weight in excess of 1,000.

4. The method of claim 1 wherein said polyoxyalkylene polyol compound is a condensation product of propylene oxide and pentaerythritol and has a molecular weight in excess of 1,000.

5. The method of claim 1 wherein said polyoxyalkylene polyol compound is a condensation product of propylene oxide and 1,2,6-hexanetriol and has a molecular weight in excess of 1,000.

6. The method of claim 1 wherein said polyoxyalkylene polyol compound is a condensation product of propylene oxide and propylene glycol and has a molecular weight in excess of 1,000.

7. A method of removing unsaturation found in polyoxyalkylene polyol compounds which comprises intimately contacting said polyoxyalkylene polyol compound with a mixture, having a pH less than 8.0, of water and sulfonated polystyrene resin at a temperature of about 20° C. to about 70° C., wherein the water is present in a sufficient amount to saturate the polyoxyalkylene polyol compound and the resin is about 5 to about 15 weight percent of the polyoxyalkylene polyol compound, said resin being activated by a replacement of a portion of its acidic hydrogen atoms by mercuric ions; furthermore, said polyoxyalkylene polyol compounds being characterized by having an average oxygen:carbon atom ratio of less than 0.45 and a molecular weight from about 600 to about 25,000 and being a condensation product of an alkylene oxide containing from about 2 to 12 carbon atoms and an alkane polyol having from about 2 to 8 hydroxyl groups.

8. The method of claim 7 wherein the polyoxyalkylene polyol compound is a condensation product of propylene oxide and propylene glycol having a molecular weight in excess of 1,000.

9. The method of claim 7 wherein the polyoxyalkylene polyol compound is a condensation product of propylene oxide and glycerol having a molecular weight in excess of 1,000.

10. The method of claim 7 wherein the polyoxyalkylene polyol compound is a condensation product of propylene oxide and 1,1,1-trimethylolpropane having a molecular weight in excess of 1,000.

11. The method of claim 7 wherein the polyoxyalkylene polyol compound is a condensation product of propylene oxide and pentaerythritol having a molecular weight in excess of 1,000.

12. The method of claim 7 wherein the polyoxyalkylene polyol compound is a condensation product of propylene oxide and 1,2,6-hexanetriol having a molecular weight in excess of 1,000.

13. A method of removing unsaturation found in polyoxyalkylene polyol compounds which comprises intimately contacting said compound with a mixture, having a pH less than 8.0, of water and sulfonated polystyrene resin at a temperature of about 15° C. to about 100° C., wherein the resin is present in the minimum amount of 1 weight percent of the polyoxyalkylene compound, said resin being activated by a replacement of a portion of its acidic hydrogen atoms by mercuric ions; furthermore, said polyoxyalkylene polyol compound having a molecular weight in excess of 1,000 and an oxygen:carbon atom ratio of less than 0.45 and being the condensation product of an alkane polyol having from about 2 to 8 hydroxyl groups and at least two alkylene oxides selected from the group consisting of ethylene oxide, propylene oxide and butylene oxide.

14. The method of claim 13 wherein the alkane polyol is selected from the group consisting of propylene glycol, glycerol, 1,1,1-trimethylolpropane, pentaerythritol and 1,2,6-hexanetriol.

15. A method of removing unsaturation found in polyoxybutylene polyol compounds having a molecular weight in excess of 1,000 which comprises intimately contacting said compound with a mixture, having a pH less than 8.0, of water and sulfonated polystyrene resin at a temperature of about 15° C. to about 100° C. wherein the resin is present in the minimum amount of 1 weight percent of the polyoxybutylene compound, said resin being activated by a replacement of a portion of its acidic hydrogen atoms by mercuric ions; furthermore, said polyoxybutylene polyol compound being a condensation product of butylene oxide and an alkane polyol having from about 2 to 8 hydroxyl groups.

16. The method of claim 15 wherein the alkane polyol is propylene glycol.

17. The method of claim 15 wherein the alkane polyol compound is glycerol.

18. The method of claim 15 wherein the alkane polyol is 1,1,1-trimethylolpropane.

19. The method of claim 15 wherein the alkane polyol is pentaerythritol.

20. The method of claim 15 wherein the alkane polyol is 1,2,6-hexanetriol.

References Cited by the Examiner

UNITED STATES PATENTS

| | | | |
|---|---|---|---|
| 1,922,459 | 8/1933 | Schmidt et al. | 260—615 X |
| 2,891,999 | 6/1959 | Langer | 260—614 |
| 2,996,550 | 8/1961 | Simons | 260—615 |

OTHER REFERENCES

Dege et al., Jour. Amer. Chem. Soc., vol. 81 (1959), pages 3374–3379.

St. Pierre et al., Jour. Amer. Chem. Soc., vol. 78 (1956), pages 3432–3436.

LEON ZITVER, *Primary Examiner.*

B. HELFIN, H. T. MARS, *Assistant Examiners.*